US008944402B2

(12) United States Patent
Sun

(10) Patent No.: US 8,944,402 B2
(45) Date of Patent: Feb. 3, 2015

(54) MOUNTING DEVICE FOR FAN

(75) Inventor: Zheng-Heng Sun, New Taipei (TW)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 130 days.

(21) Appl. No.: 13/531,394

(22) Filed: Jun. 22, 2012

(65) Prior Publication Data

US 2013/0320186 A1 Dec. 5, 2013

(30) Foreign Application Priority Data

Jun. 5, 2012 (CN) ............................ 2012 1 081911

(51) Int. Cl.
*F16M 11/00* (2006.01)

(52) U.S. Cl.
USPC ...... 248/674; 248/675; 248/300; 248/346.01; 361/697

(58) Field of Classification Search
USPC ......... 248/674, 628, 617, 618, 619, 675, 678, 248/27.1, 27.3, 200, 201, 346.01, 346.04, 248/637, 638, 510; 361/697, 704, 707, 709, 361/710
See application file for complete search history.

(56) References Cited

U.S. PATENT DOCUMENTS 4,834,615 A * 5/1989 Mauch et al. .............. 415/213.1
4,888,637 A * 12/1989 Sway-Tin et al. ............. 174/252
5,509,465 A * 4/1996 Lai .............................. 165/80.3
5,960,862 A * 10/1999 Hu .............................. 165/80.3
5,991,152 A * 11/1999 Chiou ........................... 361/704
6,239,974 B1 * 5/2001 Tseng ........................... 361/704
6,392,885 B1 * 5/2002 Lee et al. ...................... 361/697
6,404,633 B1 * 6/2002 Hsu .............................. 361/703
6,407,919 B1 * 6/2002 Chou ............................ 361/697
6,434,004 B1 * 8/2002 Matteson ...................... 361/704
6,654,246 B2 * 11/2003 Wu .............................. 361/697
6,992,889 B1 * 1/2006 Kashiwagi et al. ........... 361/700
7,289,324 B2 * 10/2007 Yu ................................ 361/697
7,365,975 B2 * 4/2008 Xia et al. ...................... 361/695
7,385,814 B1 * 6/2008 Chen ............................ 361/695
7,408,774 B1 * 8/2008 Anderl et al. ................ 361/695
7,518,865 B2 * 4/2009 Anderl et al. ................ 361/695
7,583,498 B2 * 9/2009 Chen et al. ............... 361/679.48
8,047,780 B2 * 11/2011 Chen et al. ................. 415/213.1
2004/0000398 A1 * 1/2004 Lee et al. ..................... 165/185
2007/0053160 A1 * 3/2007 Chen ............................ 361/695
2008/0137295 A1 * 6/2008 Chen ............................ 361/695
2008/0253886 A1 * 10/2008 Chen .......................... 415/213.1
2009/0135552 A1 * 5/2009 Tu et al. ........................ 361/676
2009/0288803 A1 * 11/2009 Chen et al. ................... 165/80.2
2012/0328449 A1 * 12/2012 Xia et al. .................. 416/244 R
2013/0216374 A1 * 8/2013 Sun ........................... 415/213.1
2013/0256499 A1 * 10/2013 Sun .............................. 248/674
2013/0256500 A1 * 10/2013 Sun .............................. 248/674
2013/0256502 A1 * 10/2013 Sun .............................. 248/675
2013/0259675 A1 * 10/2013 Sun ........................... 415/213.1
2013/0259676 A1 * 10/2013 Sun ........................... 415/213.1
2013/0272867 A1 * 10/2013 Sun ........................... 415/213.1
2013/0272868 A1 * 10/2013 Sun ........................... 415/213.1

* cited by examiner

*Primary Examiner* — Terrell McKinnon
*Assistant Examiner* — Monica Millner
(74) *Attorney, Agent, or Firm* — Novak Druce Connolly Bove + Quigg LLP

(57) ABSTRACT

A mounting device for mounting a fan having two opposite boards includes a base board and two fixing members. The base board forms two rods. Each fixing member includes a connecting portion and two tabs perpendicularly extending up from the connecting portion. The connecting portion defines a fixing hole in which a corresponding rod engages. Four fasteners respectively extend through the tabs and then engage in the opposite boards of the fan, to fix the fixing members to the boards of the fan, respectively. A resilient member is mounted to a bottom of each fixing member for absorbing vibrations of the fan.

7 Claims, 5 Drawing Sheets

MOUNTING DEVICE FOR FAN

CROSS-REFERENCE TO RELATED APPLICATIONS

Relevant subject matter is disclosed in a pending U.S. patent application, titled "MOUNTING DEVICE FOR FAN", filed on Jun. 18, 2012, with the application Ser. No. 13/525,390, which is assigned to the same assignee as this patent application.

BACKGROUND

1. Technical Field

The present disclosure relates to a mounting device for mounting a fan.

2. Description of Related Art

Many electronic devices use fans to cool internal components. The fans may be mounted to a rack by a plurality of fasteners, and then are mounted in an electronic device together with the rack, which adds to the cost of the rack, and the rack cannot absorb vibrations of the fans.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
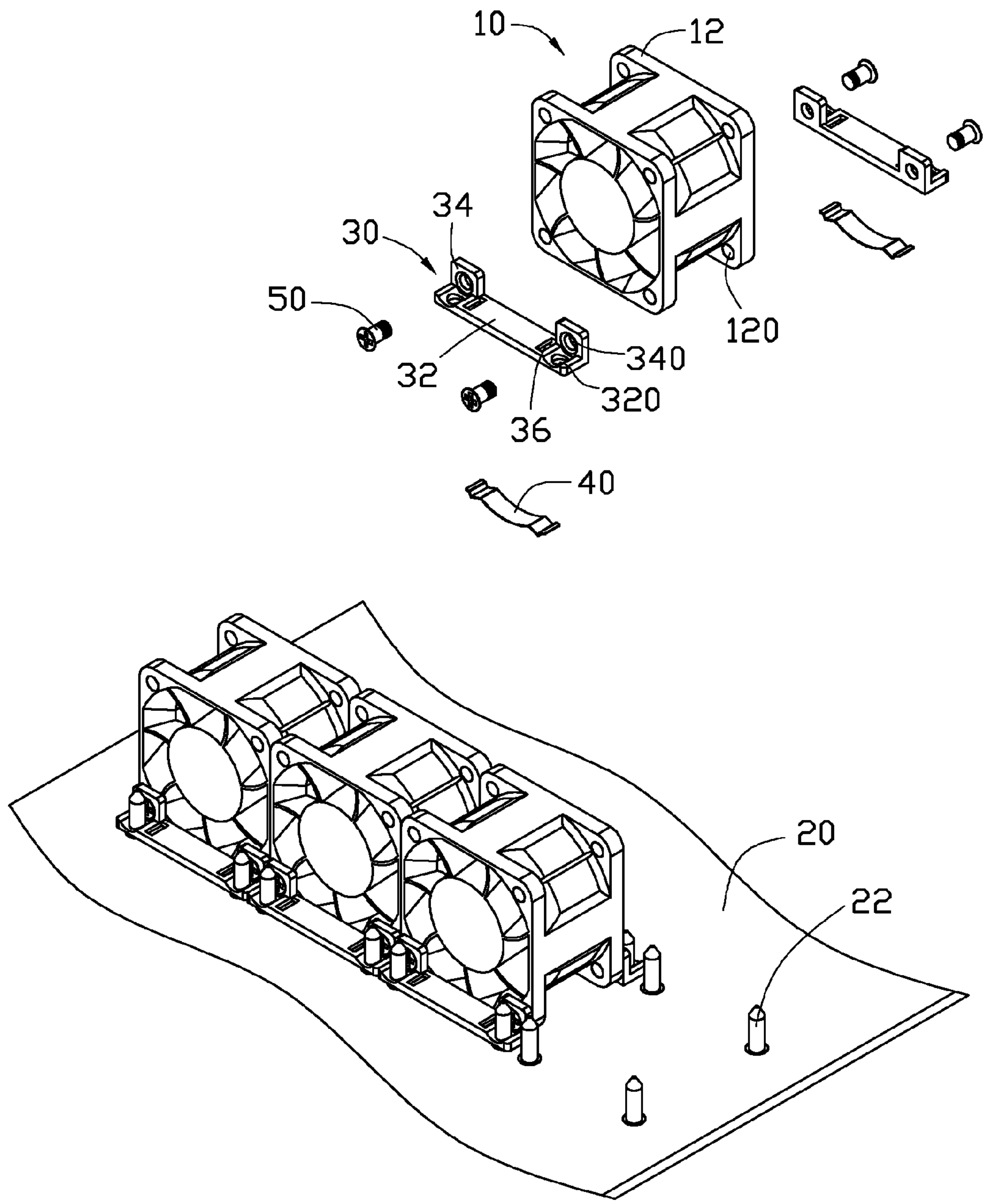
FIG. 1 is an exploded, isometric view of an exemplary embodiment of a mounting device together with a plurality of fans, wherein the mounting device includes a plurality of resilient members, and a plurality of fixing members.
Figure 2:
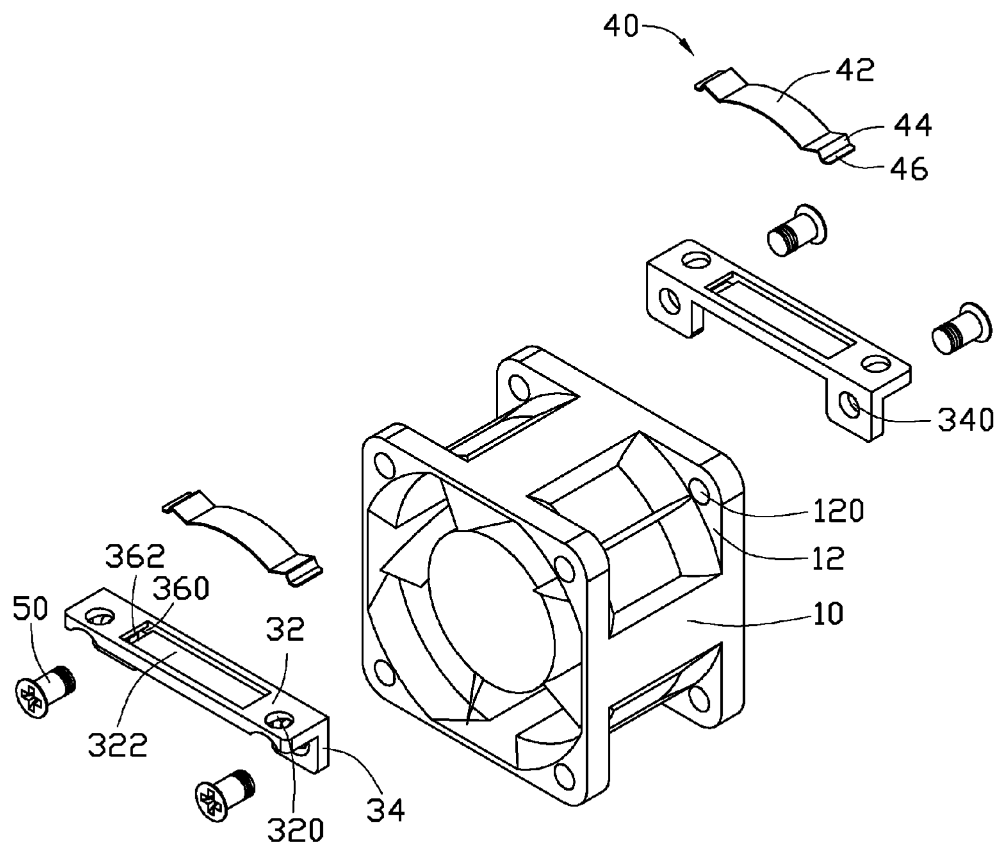
FIG. 2 is an inverted view showing two of the resilient members, two of the fixing members, and one of the fans of FIG. 1.

FIGS. 1 and 2, is an exemplary embodiment of a mounting device for fixing a plurality of fans 10. The mounting device includes a base board 20 of an electronic device (not shown), a plurality of fixing members 30, and a plurality of resilient members 40.

Each fan 10 includes two spaced boards 12 each defining two corner holes 120 in a lower portion of the board 12.

The base board 20 forms a plurality of rods 22 each having a tapered distal end.

Each fixing member 30 includes a bar-shaped connecting portion 32 and two tabs 34 perpendicularly extending up from opposite ends of one of opposite sides of the connecting portion 32. The connecting portion 32 defines a depressed portion 36 adjacent to each tab 34. Each depressed portion 36 defines a through hole 360 extending through the top and bottom of the connecting portion 32, and forms a step 362 between the nearer tab 34 and the through hole 360. Each tab 34 defines a fixing hole 340 extending through opposite sides of the tab 34. The connecting portion 32 defines two engaging holes 320 aligning with the tabs 34, respectively. A receiving groove 322 communicating with the through holes 360 is defined in the bottom of the connecting portion 32.

Each resilient member 40 includes an arc-shaped main piece 42, two substantially V-shaped connecting pieces 44 extending from opposite ends of the main piece 42, and two fixing pieces 46 extending out from distal ends of the connecting pieces 44, respectively.

Figure 3:
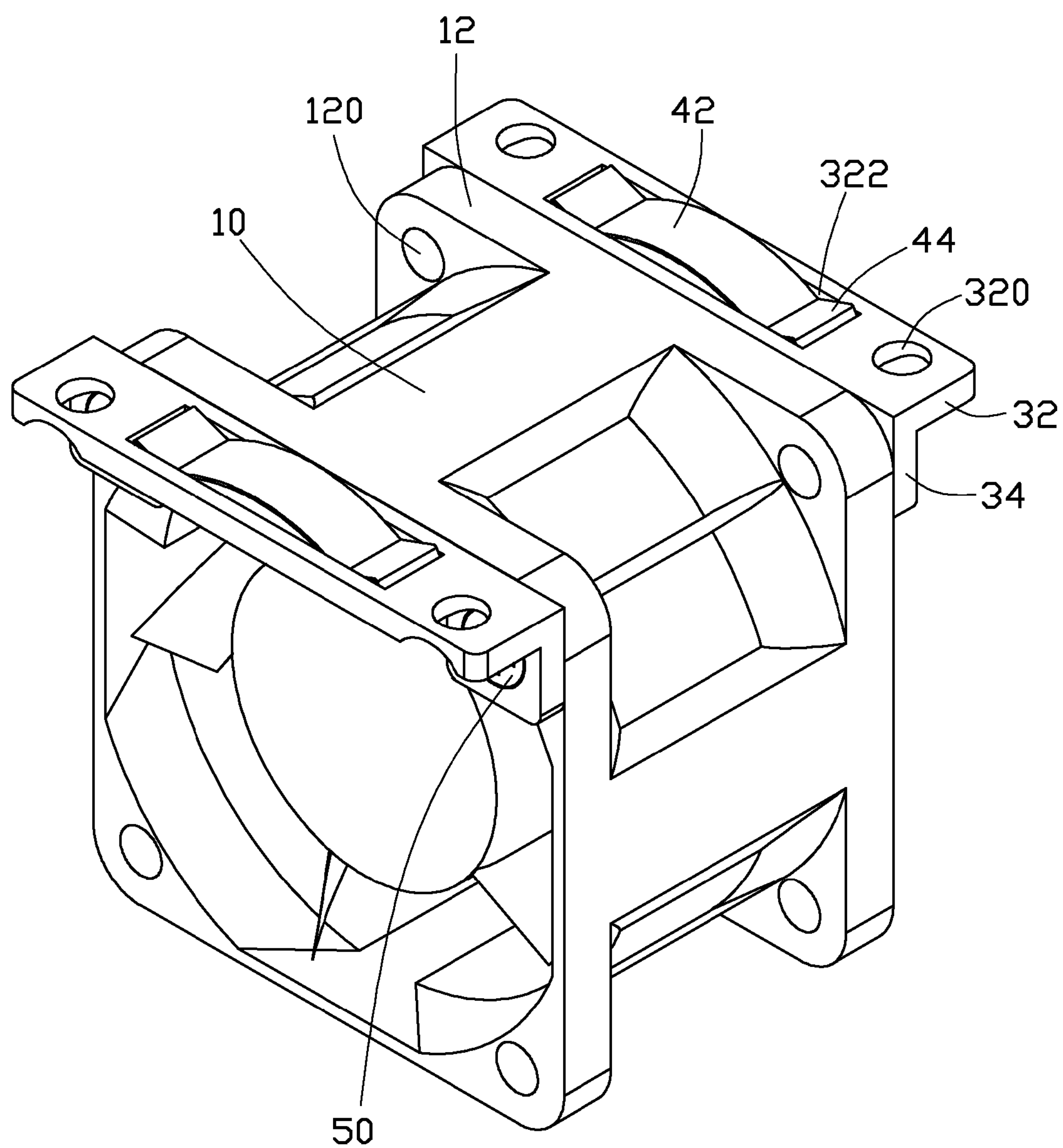
FIG. 3 is an assembled, isometric view of FIG. 2.

Referring to FIG. 3, in assembling of each resilient member 40 to a corresponding fixing member 30, the resilient member 40 is attached to the bottom of the corresponding connecting portion 32. The fixing pieces 46 extend through the through holes 360 and engage with top surfaces of the corresponding steps 362 opposite to the corresponding receiving groove 322, thereby fixing the resilient member 40 in the corresponding receiving groove 322.

Figure 4:
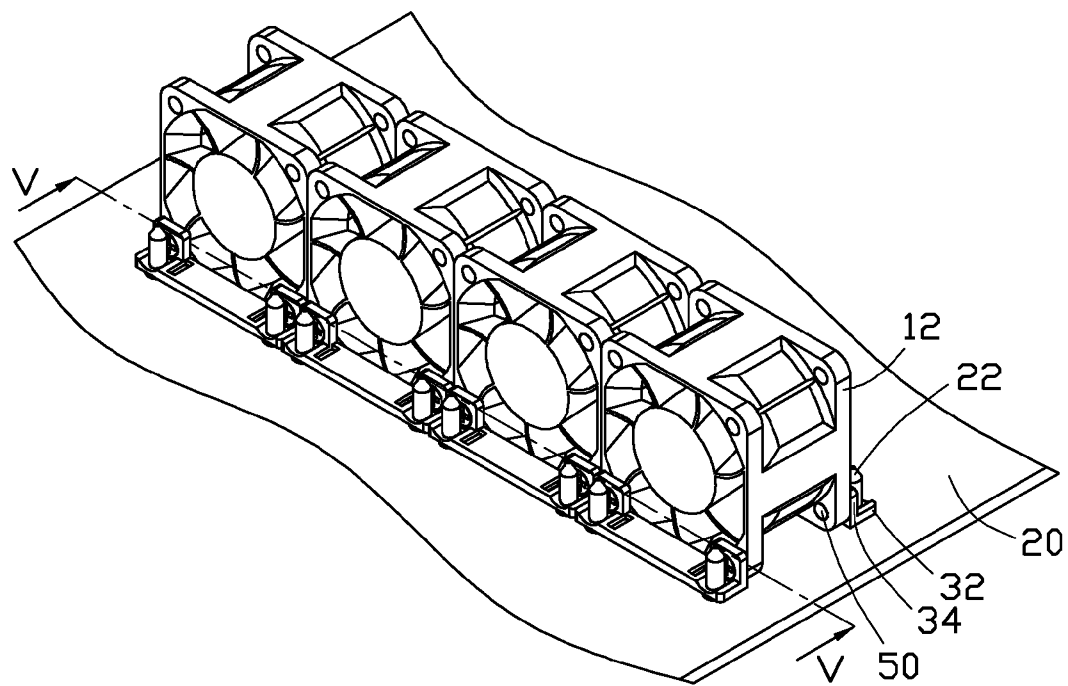
FIG. 4 is an assembled, isometric view of FIG. 1.
Figure 5:
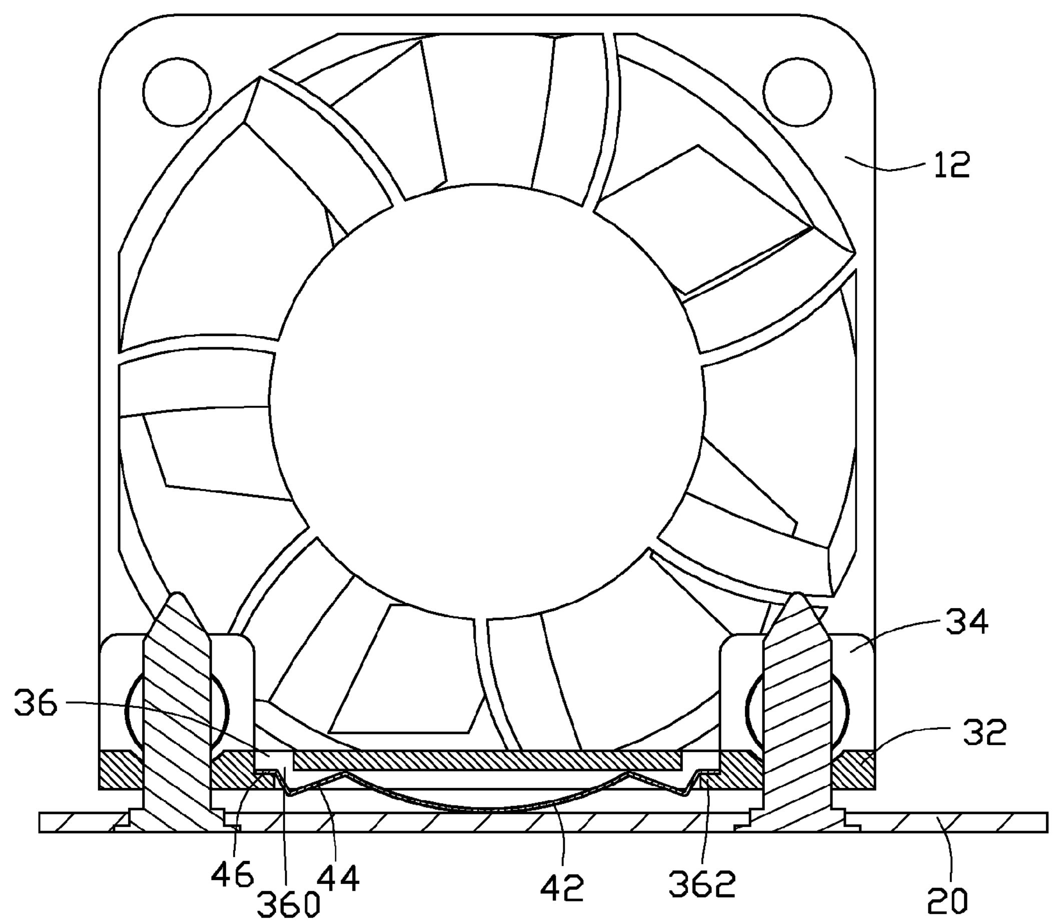
FIG. 5 is a partially sectional view of FIG. 4, taken along the line of V-V.

Referring to FIGS. 4 and 5, in mounting of each fan 10 to the base board 20, the fixing holes 340 are respectively aligned with the corner holes 120 of the fan 10 from outer surfaces of the corresponding boards 12. Four fasteners 50 are extended through the fixing holes 340, to be engaged in the corresponding corner holes 120, thereby fixing the fixing members 30 to the outer surfaces of the boards 12.

The engaging holes 320 fit about the corresponding rods 22; thereby the fan 10 is spaced and fixed to the base board 20. The resilient members 40 are deformable and are contacted to the base board 20 to absorb vibrations generated by the fan 10. A top of the fan 10 is blocked by a top board of the electronic device (not shown).

In uninstalling one of the fans 10, the fan 10 is moved away from the base board 20 to disengage the rods 22 from the corresponding engaging holes 320. The fasteners 50 are released, thereby; the fixing members 32 are readily disengaged from the corresponding boards 12 of the fan 10.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for mounting a fan having two spaced boards, comprising:

- a base board forming at least two rods;
- two fixing members each comprising a connecting portion and two tabs perpendicularly extending from the connecting portion to be fixed to outer surfaces of the boards of the fan, each connecting portion defining at least one engaging hole to be fitted about one of the at least two rods; and
- two deformable resilient members each to be mounted to a bottom of a corresponding one of the fixing members and sandwiched between the base board and the corresponding fixing member to absorb vibrations generated by the fan;
- wherein each of the resilient members comprises an arc-shaped main piece and two fixing pieces formed at opposite ends of the main piece to be fixed to opposite ends of the corresponding fixing member.

2. The mounting device of claim 1, wherein the connecting portion comprises a first surface and a second surface opposite to the first surface, the connecting portion defines a through hole adjacent to each tab, the fixing pieces of each resilient member extend through the through holes of the corresponding connecting portions to be engaged with a first surface of the corresponding connecting portion.

3. The mounting device of claim 1, wherein the connecting portion defines two depressed portions adjacent to the two tabs respectively, each depressed portion defines a through hole, and forms a step between a corresponding adjacent tab and the through hole, the fixing pieces of each resilient member extend through the through holes of the corresponding connecting portion to be engaged with top surfaces of the steps.

4. The mounting device of claim 3, wherein the connecting portion of each fixing member defines a receiving groove communicating with the corresponding through holes in a second surface, each resilient member is positioned in the receiving groove of the corresponding fixing member.

5. The mounting device of claim 2, wherein the connecting portion of each fixing member defines a receiving groove communicating with the through holes in a bottom surface, each resilient member is positioned in the receiving groove of the corresponding fixing member.

6. The mounting device of claim 1, wherein each resilient member further comprises two substantially V-shaped connecting pieces connected between the main piece and the corresponding fixing pieces.

7. The mounting device of claim 1, wherein the tabs of each fixing member perpendicularly extend up from opposite ends of one of opposite sides of the corresponding connecting portion.

* * * * *